United States Patent
Chen et al.

(10) Patent No.: US 9,866,166 B2
(45) Date of Patent: ***Jan. 9, 2018

(54) FOUR-PHASE SWITCHED RELUCTANCE MOTOR TORQUE RIPPLE TWO-LEVEL SUPPRESSION METHOD

(71) Applicant: CHINA UNIVERSITY OF MINING AND TECHNOLOGY, Jiangsu (CN)

(72) Inventors: Hao Chen, Jiangsu (CN); Hui Zeng, Jiangsu (CN)

(73) Assignee: CHINA UNIVERSITY OF MINING AND TECHNOLOGY (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/114,052

(22) PCT Filed: Aug. 19, 2015

(86) PCT No.: PCT/CN2015/087498
§ 371 (c)(1),
(2) Date: Jul. 25, 2016

(87) PCT Pub. No.: WO2016/029815
PCT Pub. Date: Mar. 3, 2016

(65) Prior Publication Data
US 2017/0272022 A1 Sep. 21, 2017

(30) Foreign Application Priority Data
Aug. 27, 2014 (CN) .......................... 2014 1 0432965

(51) Int. Cl.
*H02P 25/098* (2016.01)
*H02P 25/089* (2016.01)

(52) U.S. Cl.
CPC .......... *H02P 25/098* (2016.02); *H02P 25/089* (2016.02)

(58) Field of Classification Search
CPC .......... H02P 6/10; H02P 25/098; H02P 25/08; H02P 2205/05; H02P 25/089; B60L 2220/18

See application file for complete search history.

(56) References Cited

U.S. PATENT DOCUMENTS 5,780,986 A * 7/1998 Shelton .................. G05B 11/28
 318/400.11
5,998,952 A * 12/1999 McLaughlin ......... H02P 25/098
 318/432

(Continued)

FOREIGN PATENT DOCUMENTS

| CN | 1758528 | 4/2006 | ............... H02P 6/10 |
| CN | 201113871 | 9/2008 | ............... H02P 6/08 |
| CN | 104201855 | 12/2014 | ............. H02K 29/03 |

OTHER PUBLICATIONS

International Search Report (with translation) and Written Opinion issued in application No. PCT/CN2015/087498, dated Oct. 29, 2015 (9 pgs).

(Continued)

*Primary Examiner* — Bentsu Ro
*Assistant Examiner* — Thai Dinh
(74) *Attorney, Agent, or Firm* — Hayes Soloway P.C.

(57) ABSTRACT

A four-phase switched reluctance motor torque ripple two-level suppression method in which power is supplied to adjacent phase A and phase B for excitation. The power supplied for excitation to phase A leads the power supplied for excitation to phase B by θr/4. An entire commutation process from phase A to phase B is divided into two intervals, phase A which uses the second set of torque thresholds while phase B uses the first set of torque thresholds. Critical position θ1 automatically appears in the commutation process, thus obviating the need for additional calculations. Total torque is controlled between [Te+th2low (Continued)

and Te+th2up]. In rotor position interval [θ1, θr/4], phase A continues to use the second set of torque thresholds, phase B continues to use the first set of torque thresholds, and the total torque is controlled between [Te+th1low and Te+th1up].

2 Claims, 1 Drawing Sheet

(56) References Cited

U.S. PATENT DOCUMENTS

| | | | | |
|---|---|---|---|---|
| 6,002,226 | A * | 12/1999 | Collier-Hallman | H02P 6/10 318/139 |
| 6,448,724 | B1 * | 9/2002 | Kleinau | B62D 5/046 318/139 |
| 6,559,617 | B2 * | 5/2003 | Kim | H02P 25/098 318/432 |
| 6,720,752 | B2 * | 4/2004 | Nishimura | H02P 6/085 318/432 |
| 6,847,182 | B2 * | 1/2005 | Ricotti | H02P 6/34 318/599 |
| 6,900,607 | B2 * | 5/2005 | Kleinau | B62D 5/0496 180/446 |
| 7,157,878 | B2 * | 1/2007 | Collier-Hallman | B62D 5/046 318/472 |
| 8,138,712 | B2 * | 3/2012 | Yamada | H02M 1/12 318/400.01 |
| 8,544,580 | B2 * | 10/2013 | Cheng | H02P 25/08 180/65.51 |

OTHER PUBLICATIONS

Zhang et al., "Control Strategies of Switched Reluctance Motors," S & M Electric Machines, vol. 28, No. 2, Apr. 1, 2001, pp. 31-35, translation of abstract only (5 pgs).

* cited by examiner

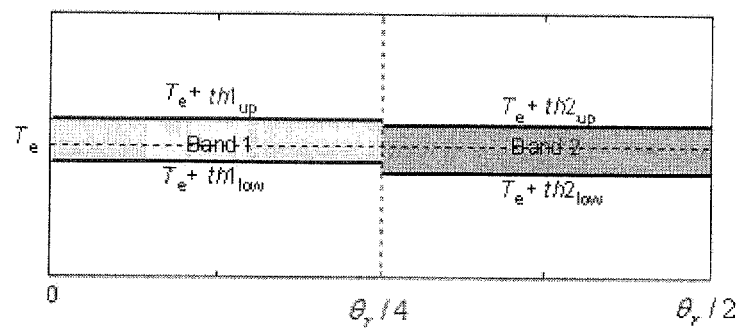
Figure 1
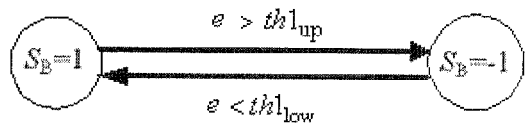 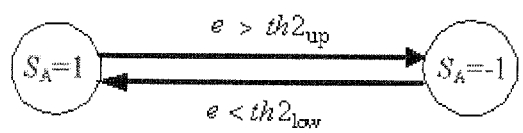
Figure 2 (a)                                   Figure 2 (b)
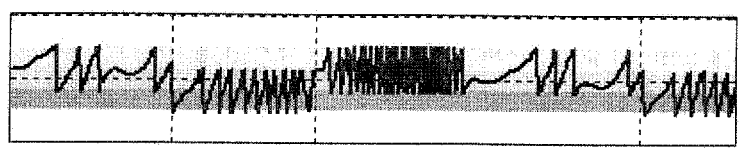
Figure 3

FOUR-PHASE SWITCHED RELUCTANCE MOTOR TORQUE RIPPLE TWO-LEVEL SUPPRESSION METHOD

FIELD OF THE INVENTION

The present invention relates to a method for torque pulsation two-level suppression of switch reluctance motor, which is applicable to a driving system of four-phase switch reluctance motor.

BACKGROUND OF THE INVENTION

Conventional direct torque control of switch reluctance motor is used for elimination of torque pulsation, and a turn-off angle of the main switch of power converter should be set. The turn-off angle of main switch of power converter has important influence on the torque control performance. To smoothen the output torque, the turn-off angle would be determined by means of offline calculation or online adjustment. To produce maximum smooth torque, the exciting current must be established quickly. Therefore, upon entry into the conduction interval, the current should be increased at a maximum rate; to avoid the generation of a negative torque, the current should be decreased at a maximum rate. The turn-off angle of main switch of power converter should be at an appropriate position; if the turn-off angle is advanced, the current cannot be increased to the specified level, and the torque is lower than the expected value; if the turn-off angle is lagged, the current will enter into the negative torque region. Therefore, the practicability is poor owing to the strict requirement. Hence, it is desirable to develop a new torque pulsation suppression method for switch reluctance motor, which can realize smooth output torque control in a maximum range, without taking consideration of the influence of the turn-off angle of main switch of the power converter on the torque control performance.

Contents of the Invention

To overcome the drawbacks in the prior art, the present invention provides a method for torque pulsation two-level suppression of four-phase switch reluctance motor.

The method for torque pulsation two-level suppression of four-phase switch reluctance motor provided in the present invention comprises the following steps:

a. setting a first group of torque thresholds ($th1_{low}$, $th1_{up}$) in a rotor position interval [0°, $\theta_r/4$], and setting a second group of torque thresholds ($th2_{low}$, $th2_{up}$) in a rotor position interval [$\theta_r/4$, $\theta_r/2$], wherein, these four torque thresholds meet the following requirements:

$$th1_{up} > th2_{up} > 0 \quad (1)$$

$$th2_{low} < th1_{low} < 0 \quad (2)$$

$$|th1_{up}| = |th2_{low}| \quad (3)$$

$$|th2_{up}| = |th2_{low}| \quad (4)$$

wherein, the rotor position 0° is the minimum phase inductance position, the rotor position $\theta_r$ is the pitch angle, i.e., one rotor cycle, and half rotor cycle is $\theta_r/2$;

b. setting the power supply excitation state of phase A as excitation state $S_A$, wherein, excitation state $S_A=1$ indicates the power supply excitation voltage of phase A is positive, and excitation state $S_A=-1$ indicates the power supply excitation voltage of phase A is negative; setting the power supply excitation state of phase B as excitation state $S_B$, wherein, excitation state $S_B=1$ indicates the power supply excitation voltage of phase B is positive, and excitation state $S_B=-1$ indicates the power supply excitation voltage of phase B is negative; setting the expected total smooth torque as $T_e$;

c. supplying power supply excitation to the adjacent phase A and phase B, wherein, the power supply excitation of phase A is ahead of the power supply excitation of phase B by $\theta_r/4$; at this moment, phase A is turned off, while phase B is turned on; thus, by commutation process of dividing into two intervals from phase A to phase B, torque pulsation two-level suppression of the four-phase switch reluctance motor is realized.

The commutation process of dividing into two intervals from phase A to phase B is as follows:

(1) in the rotor position interval [0°, $\theta_1$], the second group of torque thresholds ($th2_{low}$, $th2_{up}$) is used for phase A, the first group of torque thresholds ($th1_{low}$, $th1_{up}$) is used for phase B, and the critical position $\theta_1$ appears automatically in the commutation process without the need for any additional calculation;

(1.1) entering into phase B breakover period at the position of rotor position 0°, the initial excitation state is set to $S_B=1$, and the current and the torque of phase B begin to increase from 0; the excitation state $S_A$ remains in the original state $S_A=-1$, and the current and the torque of phase A decrease. Since the inductance change rate and the current of phase B are lower at this position, the torque increasing rate of phase B is lower than the torque decreasing rate of phase A, and the total torque decreases along with phase A;

(1.2) when the total torque reaches a torque value $T_e+th1_{low}$ firstly, the state transition criteria for phase A and phase B are not met, the excitation states $S_A$ and $S_B$ remain in the original states, and the total torque continues decreasing;

(1.3) when the total torque decreases to a torque value $T_e+th2_{low}$, the state transition criteria for phase A are met; thus, the excitation state $S_A$ switches from $-1$ to $1$, and the torque of phase A increases; phase B remains in the original state, and the torque of phase B continues increasing; consequently, the total torque increases;

(1.4) when the total torque increases to a torque value $T_e+th1_{low}$, the state transition criteria for phase A and phase B are not met, the excitation states $S_A$ and $S_B$ remain in the original states, and the total torque continues increasing;

(1.5) when the total torque increases to a torque value $T_e+th2_{up}$, the state transition criteria for phase A are met; thus, the excitation state $S_A$ switches from $1$ to $-1$, and the torque of phase A decreases; since the state transition criteria for phase B are not met, the excitation state $S_B$ remains in the original state, and the total torque begins to decrease;

(1.6) the steps (1.2)~(1.5) are repeated, and the excitation state $S_B$ always remains in the state of 1, i.e., phase B is excited by positive voltage, and the current and the torque of phase B increase at maximum rates; the excitation state $S_A$ switches between $-1$ and $1$, and the total torque is controlled within a range of [$T_e+th2_{low}$, $T_e+th2_{up}$]; thus, the pulsation of the four-phase switch reluctance motor in the rotor position interval [0°, $\theta_1$] is inhibited;

(2) in a rotor position interval [$\theta_1$, $\theta_r/4$], the second group of torque thresholds ($th2_{low}$, $th2_{up}$) is still used for phase A, and the first group of torque thresholds ($th1_{low}$, $th1_{up}$) is still used for phase B;

(2.1) at rotor position $\theta_1$, the inductance change rate and the phase current of phase B have reached to a certain level; when the excitation state $S_B=1$ and the excitation state $S_A=-1$, the torque increase rate of phase B is not lower than the torque decrease rate of phase A anymore, the total torque change trend is determined by phase B, and the total torque increases;

(2.2) when the total torque increases to a torque value $T_e+th1_{up}$, the state transition criteria for phase B are met; thus, the excitation state $S_B$ switches from 1 to -1, and the torque of phase B decreases; the excitation state $S_A$ remains in the state of -1, and the total torque decreases;

(2.3) when the total torque decreases to a torque value $T_e+th2_{up}$ firstly, the state transition criteria for phase A and phase B are not met, the excitation states $S_A$ and $S_B$ remain in the original states, and the total torque continues decreasing;

(2.4) when the total torque decreases to a torque value $T_e+th1_{low}$, the state transition criteria for phase B are met; thus, the excitation state $S_B$ switches from -1 to 1, and the torque of phase B increases; the excitation state $S_A$ remains in the state of -1; the total torque increases as the torque of phase B increases;

(2.5) when the total torque increases to a torque value $T_e+th2_{up}$, the state transition criteria for phase A and phase B are not met, the excitation states $S_A$ and $S_B$ remain in the original states, and the total torque continues increasing;

(2.6) when the total torque increases to a torque value $T_e+th$ the steps (2.2)~(2.5) are repeated, the excitation state $S_A$ remains in the state of -1, the excitation state $S_B$ switches between -1 and 1, and the total torque is controlled within a range of $[T_e+th1_{low}, T_e+th1_{up}]$; thus, the pulsation of the four-phase switch reluctance motor in the rotor position interval $[\theta_1, \theta_r/4]$ is inhibited.

Beneficial effects: With the technical scheme described above, in the present invention, it is unnecessary to consider the influence of the turn-off angle of main switch of the power converter with different power on the torque control performance and unnecessary to determine the turn-off angle by means of offline calculation or online adjustment; instead, only two groups of torque thresholds and the excitation states of the adjacent phase A and phase B have to be set, so that the phase A and the phase B can switch between two excitation states (positive supply excitation voltage stat and negative supply excitation voltage), and the total torque is controlled between the two sets of torque thresholds; thus, the instantaneous torque of a four-phase switch reluctance motor can be controlled smoothly, and the torque pulsation of the four-phase switch reluctance motor can be inhibited, the actual excitation voltage waveforms of the motor windings have the same characteristics as the expected voltage waveforms, and the actual phase current waveforms highly match the expected phase current waveforms. The method has high practicability, is applicable to different types and different structures of four-phase switch reluctance motor driving systems, and has extensive application prospects.

DESCRIPTION OF THE DRAWINGS

FIG. 1 is a schematic diagram of the setting of two-level torque thresholds of a switch reluctance motor in the present invention;

FIG. 2(a) is a schematic diagram of power supply excitation state transition of phase B in the present invention;

FIG. 2(b) is a schematic diagram of power supply excitation state transition of phase A in the present invention;

FIG. 3 shows the torque waveform of a switch reluctance motor in the present invention.

EMBODIMENTS

Hereunder the present invention will be further described with the examples shown in the accompanying drawings:

As shown in FIG. 1, for a four-phase switch reluctance motor, the steps of the method are as follows:

a. setting a first group of torque thresholds $(th1_{low}, th1_{up})$ in a rotor position interval $[0°, \theta_r/4]$, and setting a second group of torque thresholds $(th2_{low}, th2_{up})$ in a rotor position interval $[\theta_r/4, \theta_r/2]$, wherein, these four torque thresholds meet the following requirements:

$$th1_{up} > th2_{up} > 0 \qquad (1)$$

$$th2_{low} < th1_{low} < 0 \qquad (2)$$

$$|th1_{up}| = |th2_{low}| \qquad (3)$$

$$|th2_{up}| = |th1_{low}| \qquad (4)$$

wherein, the rotor position 0° is the minimum phase inductance position, the rotor position $\theta_r$ is the pitch angle, i.e., one rotor cycle, and half rotor cycle is $\theta_r/2$;

b. as shown in FIG. 2, setting the power supply excitation state of phase A as excitation state $S_A$, wherein, excitation state $S_A=1$ indicates the power supply excitation voltage of phase A is positive, and excitation state $S_A=-1$ indicates the power supply excitation voltage of phase A is negative; setting the power supply excitation state of phase B as excitation state $S_B$, wherein, excitation state $S_B=1$ indicates the power supply excitation voltage of phase B is positive, and excitation state $S_B=-1$ indicates the power supply excitation voltage of phase B is negative; setting the expected total smooth torque as $T_e$;

c. supplying power supply excitation to the adjacent phase A and phase B, wherein, the power supply excitation of phase A is ahead of the power supply excitation of phase B by $\theta_r/4$; at this moment, phase A is turned off, while phase B is turned on; as shown in FIG. 1, the commutation process of dividing into two intervals from phase A to phase B is as follows:

(1) in the rotor position interval $[0°, \theta_1]$, the second group of torque thresholds $(th2_{low}, th2_{up})$ is used for phase A, the first group of torque thresholds $(th1_{low}, th1_{up})$ is used for phase B, and the critical position $\theta_1$ appears automatically in the commutation process without the need for any additional calculation;

(1.1) entering into phase B breakover period at the position of rotor position 0°, the initial excitation state is set to $S_B=1$, and the current and the torque of phase B begin to increase from 0; the excitation state $S_A$ remains in the original state $S_A=-1$, and the current and the torque of phase A decrease. Since the inductance change rate and the current of phase B are lower at this position, the torque increasing rate of phase B is lower than the torque decreasing rate of phase A, and the total torque decreases along with phase A;

(1.2) when the total torque reaches a torque value $T_e+th1_{low}$ firstly, the state transition criteria for phase A and phase B are not met, the excitation states $S_A$ and $S_B$ remain in the original states, and the total torque continues decreasing;

(1.3) when the total torque decreases to a torque value $T_e+th2_{low}$, the state transition criteria for phase A are met; thus, the excitation state $S_A$ switches from −1 to 1, and the torque of phase A increases; phase B remains in the original state, and the torque of phase B continues increasing; consequently, the total torque increases;

(1.4) when the total torque increases to a torque value $T_e+th1_{low}$, the state transition criteria for phase A and phase B are not met, the excitation states $S_A$ and $S_B$ remain in the original states, and the total torque continues increasing;

(1.5) when the total torque increases to a torque value $T_e+th2_{up}$, the state transition criteria for phase A are met; thus, the excitation state $S_A$ switches from 1 to −1, and the torque of phase A decreases; since the state transition criteria for phase B are not met, the excitation state $S_B$ remains in the original state, and the total torque begins to decrease;

(1.6) the steps (1.2)~(1.5) are repeated, and the excitation state $S_B$ always remains in the state of 1, i.e., phase B is excited by positive voltage, and the current and the torque of phase B increase at maximum rates; the excitation state $S_A$ switches between −1 and 1, and the total torque is controlled within a range of $[T_e+th2_{low}, T_e+th2_{up}]$; thus, the pulsation of the four-phase switch reluctance motor in the rotor position interval $[0°, \theta_1]$ is inhibited;

(2) in a rotor position interval $[\theta_1, \theta_r/4]$, the second group of torque thresholds ($th2_{low}$, $th2_{up}$) is still used for phase A, and the first group of torque thresholds ($th1_{low}$, $th1_{up}$) is still used for phase B;

(2.1) at rotor position $\theta_1$, the inductance change rate and the phase current of phase B have reached to a certain level; when the excitation state $S_B$=1 and the excitation state $S_A$=−1, the torque increase rate of phase B is not lower than the torque decrease rate of phase A anymore, the total torque change trend is determined by phase B, and the total torque increases;

(2.2) when the total torque increases to a torque value $T_e+th1_{up}$, the state transition criteria for phase B are met; thus, the excitation state $S_B$ switches from 1 to −1, and the torque of phase B decreases; the excitation state $S_A$ remains in the state of −1, and the total torque decreases;

(2.3) when the total torque decreases to a torque value $T_e+th2_{up}$ firstly, the state transition criteria for phase A and phase B are not met, the excitation states $S_A$ and $S_B$ remain in the original states, and the total torque continues decreasing;

(2.4) when the total torque decreases to a torque value $T_e+th1_{low}$, the state transition criteria for phase B are met; thus, the excitation state $S_B$ switches from −1 to 1, and the torque of phase B increases; the excitation state $S_A$ remains in the state of −1; the total torque increases as the torque of phase B increases;

(2.5) when the total torque increases to a torque value $T_e+th2_{up}$, the state transition criteria for phase A and phase B are not met, the excitation states $S_A$ and $S_B$ remain in the original states, and the total torque continues increasing;

(2.6) when the total torque increases to a torque value $T_e+th1_{up}$, the steps (2.2)~(2.5) are repeated, the excitation state $S_A$ remains in the state of −1, the excitation state $S_B$ switches between −1 and 1, and the total torque is controlled within a range of $[T_e+th1_{low}, T_e+th1_{up}]$; thus, the pulsation of the four-phase switch reluctance motor in the rotor position interval $[\theta_1, \theta_r/4]$ is inhibited.

Power supply excitation is supplied to the adjacent phase B and phase C, when the power supply excitation of phase B is ahead of the power supply excitation of phase C by $\theta_r/4$, the torque threshold setting, commutation process and excitation state switch and transfer method of phase B and phase C are similar to those in the case described above.

Power supply excitation is supplied to the adjacent phase C and phase D, when the power supply excitation of phase C is ahead of the power supply excitation of phase D by $\theta_r/4$, the torque threshold setting, commutation process and excitation state switch and transfer method of phase C and phase D are similar to those in the case described above.

Power supply excitation is supplied to the adjacent phase D and phase A, when the power supply excitation of phase D is ahead of the power supply excitation of phase A by $\theta_r/4$, the torque threshold setting, commutation process and excitation state switch and transfer method of phase D and phase A are similar to those in the case described above.

The obtained torque waveform of the switch reluctance motor is shown in FIG. 3.

The invention claimed is:

1. A method for torque pulsation two-level suppression of four-phase switched reluctance motor, comprising the steps of:
   a. setting a first group of torque thresholds ($th1_{low}$, $th1_{up}$) in a rotor position interval $[0°, \theta_r/4]$, and setting a second group of torque thresholds ($th2_{low}$, $th2_{up}$) in a rotor position interval $[\theta_r/4, \theta_r/2]$, wherein, these four torque thresholds meet following requirements:

$$th1_{up} > th2_{up} > 0 \tag{1}$$

$$th2_{low} < th1_{low} < 0 \tag{2}$$

$$|th1_{up}| = |th2_{low}| \tag{3}$$

$$|th2_{up}| = |th2_{low}| \tag{4}$$

wherein, a rotor position 0° is the minimum phase inductance position, a rotor position $\theta_r$ is the pitch angle of one rotor cycle, and a half rotor cycle is $\theta_r/2$;
   b. setting a power supply excitation state of phase A as excitation state $S_A$, wherein, excitation state $S_A$=1 indicates a power supply excitation voltage of phase A is positive, and excitation state $S_A$=−1 indicates a power supply excitation voltage of phase A is negative; setting a power supply excitation state of phase B as excitation state $S_B$, wherein, excitation state $S_B$=1 indicates the power supply excitation voltage or phase B is positive, and excitation state $S_B$=−1 indicates a power supply excitation voltage of phase B is negative; setting an expected total smooth torque as $T_e$;
   c. supplying power supply excitation to an adjacent phase A and phase B, wherein, the power supply excitation of phase A is ahead of the power supply excitation of phase B by $\theta_r/4$; at this moment, phase A is turned off, while phase B is turned on; thus, by commutation process of dividing into two intervals from phase A to phase B, torque pulsation two-level suppression of the four-phase switch reluctance motor is realized.

2. The method for torque pulsation two-level suppression for four-phase switched reluctance motor according to claim 1, wherein, the commutation process of dividing into two intervals from phase A to phase B is as follows:

(1) in rotor position interval [0°, θ$_1$], the second group of torque thresholds (th2$_{low}$, th2$_{up}$) is used for phase A, the first group of torque thresholds (th1$_{low}$, th1$_{up}$) is used for phase B, and critical position θ$_1$ appears automatically in the commutation process without the need for any additional calculation;

(1.1) entering into phase B breakover period at the position of rotor position 0°, the initial excitation state is set to S$_B$=1, and current and torque of phase B begin to increase from 0; the excitation state S$_A$ remains in the original state S$_A$=−1, and current and torque of phase A decrease, since an inductance change rate and the current of phase B are lower at this position, a torque increasing rate of phase B is lower than the torque decreasing rate of phase A, and the total torque decreases along with phase A;

(1.2) when the total torque reaches a torque value T$_e$+th1$_{low}$ firstly, a state transition criteria for phase A and phase B are not met, the excitation states S$_A$ and S$_B$ remain in a original states, and the total torque continues decreasing;

(1.3) when the total torque decreases to a torque value T$_e$+th2$_{low}$, the state transition criteria for phase A are met; thus, the excitation state S$_A$ switches from −1 to 1, and the torque of phase A increases; phase B remains in the original state, and the torque of phase B continues increasing; consequently, the total torque increases;

(1.4) when the total torque increases to a torque value T$_e$+th1$_{low}$, the state transition criteria for phase A and phase B are not met, the excitation states S$_A$ and S$_B$ remain in a original states, and the total torque continues increasing;

(1.5) when the total torque increases to a torque value T$_e$+th2$_{up}$, the state transition criteria for phase A are met; thus, the excitation state S$_A$ switches from 1 to −1 and the torque of phase A decreases; since the state transition criteria for phase B are not met, the excitation state S$_B$ remains in the original state, and the total torque begins to decrease;

(1.6) the steps (1.2)~(1.5) are repeated, and the excitation state S$_B$ always remains in the state of 1, phase B is excited by positive voltage, and the current and the torque of phase B increase at maximum rates; the excitation state S$_A$ switches between −1 and 1, and the total torque is controlled within a range of [T$_e$+th2$_{low}$, T$_e$+th2$_{up}$]; thus, the pulsation of the four-phase switch reluctance motor in the rotor position interval [0°, θ$_1$] is inhibited;

(2) in a rotor position interval [θ$_r$, θ$_r$/4], the second group of torque thresholds (th2$_{low}$, th2$_{up}$) is still used for phase A, and the first group of torque thresholds (th1$_{low}$, th1$_{up}$) is still used for phase B;

(2.1) at rotor position θ$_1$, the inductance change rate and the phase current of phase B have reached to a certain level; when the excitation state S$_B$=1 and the excitation state S$_A$=−1, the torque increase rate of phase B is not lower than the torque decrease rate of phase A anymore, the total torque change trend is determined by phase B, and the total torque increases;

(2.2) when the total torque increases to a torque value T$_e$+th1$_{up}$, the state transition criteria for phase B are met; thus, the excitation state S$_B$ switches from 1 to −1, and the torque of phase B decreases; the excitation state S$_A$ remains in the state of −1, and the total torque decreases;

(2.3) when the total torque decreases to a torque value T$_e$+th2$_{up}$ firstly, the state transition criteria for phase A and phase B are not met, the excitation states S$_A$ and S$_B$ remain in a original states, and the total torque continues decreasing;

(2.4) when the total torque decreases to a torque value T$_e$+th1$_{low}$, the state transition criteria for phase B are met; thus, the excitation state S$_B$ switches from −1 to 1, and the torque of phase B increases; the excitation state S$_A$ remains in the state of −1; the total torque increases as the torque of phase B increases;

(2.5) when the total torque increases to a torque value T$_e$+th2$_{up}$, the state transition criteria for phase A and phase B are not met, the excitation states S$_A$ and S$_B$ remain in a original states, and the total torque continues increasing;

(2.6) when the total torque increases to a torque value T$_e$+th1$_{up}$, the steps (2.2)(2.5) are repeated, the excitation state S$_A$ remains in the state of −1, the excitation state S$_B$ switches between −1 and 1, and the total torque is controlled within a range of [T$_e$+th1$_{low}$, T$_e$+th1$_{up}$]; thus, the pulsation of the four-phase switch reluctance motor in the rotor position interval [θ$_1$, θ$_r$/4] is inhibited.

* * * * *